United States Patent [19]

Mason

[11] Patent Number: 4,566,295
[45] Date of Patent: Jan. 28, 1986

[54] NEUTRAL PUMP-OUT FOR AUTOMATIC WASHER

[75] Inventor: Anthony Mason, Lincoln Township, Berrien County, Mich.

[73] Assignee: Whirlpool Corporation, Benton Harbor, Mich.

[21] Appl. No.: 630,871

[22] Filed: Sep. 4, 1984

Related U.S. Application Data

[62] Division of Ser. No. 452,285, Dec. 22, 1982, Pat. No. 4,491,210.

[51] Int. Cl.[4] .............................................. D06F 37/40
[52] U.S. Cl. .................................... 68/12 R; 68/23.7
[58] Field of Search ............... 68/12 R, 23.7; 192/46, 192/71, 114 R

[56] References Cited

U.S. PATENT DOCUMENTS

| | | |
|---|---|---|
| 1,900,957 | 3/1933 | Stanley et al. |
| 2,823,799 | 2/1958 | Johnson et al. |
| 2,869,344 | 1/1959 | Bochan |
| 3,197,982 | 8/1965 | Worst |
| 3,712,433 | 1/1973 | Thut |
| 4,038,841 | 8/1977 | Bright |
| 4,218,899 | 8/1980 | Mason |
| 4,231,237 | 11/1980 | Bochan |
| 4,283,928 | 8/1981 | Stone |
| 4,387,580 | 6/1983 | Kennedy et al. |
| 4,430,871 | 2/1984 | Brenner et al. ...................... 68/12 R |
| 4,491,210 | 1/1985 | Mason ................................. 68/23.7 |

Primary Examiner—Philip R. Coe
Assistant Examiner—Frankie L. Stinson
Attorney, Agent, or Firm—Hill, Van Santen, Steadman & Simpson

[57] ABSTRACT

A means for operating a washing machine transmission in a neutral state is provided which includes a reversible drive gear for driving the transmission in a first agitate direction and an opposite spin direction. A drive pawl is pivotally mounted on the drive gear. A pawl pivoting means, including a circular control spring with an outwardly extending tang, is selectively rotatable against either side of the pivoted pawl. A latching pawl selectively captures the tang when the drive gear rotation is reversed to the spin direction to operate the transmission in a neutral state until the rotation of the spin gear is interrupted. Means are provided to prevent relatching of the control spring if the rotation of the drive gear is subsequently interrupted.

5 Claims, 18 Drawing Figures

NEUTRAL PUMP-OUT FOR AUTOMATIC WASHER

This is a division of application Ser. No. 452,285, filed 12/22/82 and now U.S. Pat. No. 4,491,210.

BACKGROUND OF THE INVENTION

1. Field of the Invention

The present invention relates generally to automatic washing machines and more particularly to drive mechanisms for automatic washing machines.

2. Description of the Prior Art

An automatic washer spin delay mechanism is disclosed in U.S. Pat. No. 4,218,899 assigned to Whirlpool Corporation, the assignee of this application, in which a delay mechanism provides a delay in the spin cycle of an automatic washer which is operated by means of a pawl pivotable about a stud rotating on an eccentric, which in turn is engageable with a spin gear only in one direction of rotation, and thereby provides a delay of substantially one revolution of the eccentric upon a change in direction of rotation of the eccentric. The delay mechanism is utilized between an agitate portion of the wash cycle and a spin and pump-out portion of the wash cycle to allow for disengagement of rack and pinion means utilized to translate rotational movement of the motor to oscillatory movement of the agitator during the wash portion of the cycle. The oscillatory means must be disengaged so that the agitator is free to rotate with the basket at high speed during a spin portion of the cycle. During this period of time, the washing machine is filled with wash liquid when the basket and agitator begin to rotate in the spin mode.

In the washing process it has been found advantageous to pump wash and rinse liquid from the machine while the transmission is in an idle or neutral position, neither agitating nor spinning. This reduces loading on the machine's transmission and also has some advantages in alleviating re-deposition of lint and soil from the wash and rinse water onto the laundered garments. In addition, the wrinkling of garments is reduced when the machine has been drained before spinning.

Thus, a means for shifting the transmission to an idle or neutral position while the wash liquid is being pumped from the wash tub, is required to gain the advantages listed above.

Several attempts have been made to provide a means to shift the drive mechanism of an automatic washer into neutral including solenoid operated shifter arm mechanism in U.S. Pat. No. 4,283,928, a rotary damping action in U.S. Pat. No. 4,231,237, a water level responsive delay mechanism in U.S. Pat. No. 4,038,841 and a centrifugal force mechanism delaying spin in U.S. Pat. No. 3,197,982.

SUMMARY OF THE INVENTION

An automatic washer of the present invention utilizes a single motor and drive mechanism to operate a vertical axis agitator and a clothes basket during washing and drying portions of a complete cycle. A rack and pinion means is provided to translate rotational movement of the motor to oscillatory movement of the agitator during the wash portion of the cycle. The oscillatory means must be disengaged by means of a jaw clutch so that it is free to rotate with the basket at a high speed during a spin portion of the cycle. The jaw clutch is provided to cause engagement and disengagement of the oscillatory means with the agitator upon a change in direction of rotation of the motor. The disengagement means requires one complete rotation of a drive gear to ensure complete disengagement. In addition, it is found to be desirable to shift the transmission into a neutral or idle position in which the basket and agitator are neither spinning or agitating while the wash or rinse liquid are being pumped out of the washer tub. In accordance with the present invention, the transmission is shifted to an idle position for an amount of time sufficient to allow substantially all of the wash or rinse liquid to be pumped from the wash tub prior to initiation of the spinning mode. Also, means may be provided to ensure that the basket and agitator will remain in the spin mode if power is interrupted during the spin mode operation.

More specifically, a spring tang which rotates a drive pawl into a spin position when the main drive gear begins rotating in the spin direction, is prevented from engaging the drive pawl by being captured by a centrifugal latch mechanism. A latch hook captures the tang which is mounted on the drive gear for rotation therewith, but which also can slip on the drive gear, such that the tang does not contact the drive pawl to pivot it into the spin position but rather allows it to remain in the neutral position.

After the liquid has been pumped from the washer tub, there is a pause provided by the automatic timer mechanism which allows the motor and main drive gear to come to a rest. At this point the latch mechanism releases the tang which then rotates into contact with the drive pawl, pivoting it into the spin position. When power is resumed, the drive pawl engages an abutment on a spin gear to drive the spin gear and washer basket. If there is a power interruption during the spin cycle, the coasting of the basket will cause the spin gear tang to move away from the drive pawl. To prevent the tang from being recaptured by the latch mechanism upon reinstatement of power, there may be provided a means to capture the tang to prevent excessive rotation relative to the latch mechanism. Restarting of the motor in a spin direction will cause the tang to pass the hook of the latch mechanism and to again abut the drive pawl to pivot it into the spin position. If the motor is restarted in the agitate direction, the latch mechanism will release the tang and the tang will rotate in the opposite direction to contact an opposite side of the drive pawl to positively hold it in the neutral position.

The means for capturing the tang is shown in two different embodiments. In a first embodiment, there is provided a stepping pawl which engages teeth on the tang carrying spring. In a second embodiment a lock out ring has a tab which engages a stop on the tang carrying spring to capture the spring and prevent it from rotating away from the latch mechanism.

DESCRIPTION OF THE PREFERRED EMBODIMENTS

Figure 1:
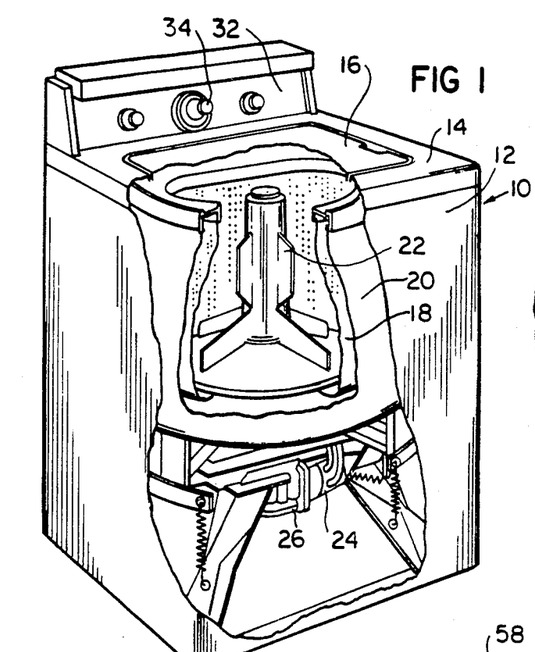
FIG. 1 is a perspective view, partially broken away, of an automatic laundry appliance embodying the present invention.

An automatic washing machine is generally illustrated in FIG. 1 at 10 and comprises a cabinet 12 with a top 14 and an openable lid 16 thereon. The lid 16 opens to provide access to the interior of a perforate wash basket 18 mounted concentrically within an imperforate wash tub 20.

A vertically mounted agitator 22 is carried within the wash basket 18 and is driven by an electric motor 24 operating through a transmission 26.

The top 14 of the washing machine is provided with a console 32 which carries the user operated controls including a timer actuated control 34 used in selecting and operating the machine through a series of washing, rinsing and drying steps.

Figure 2:
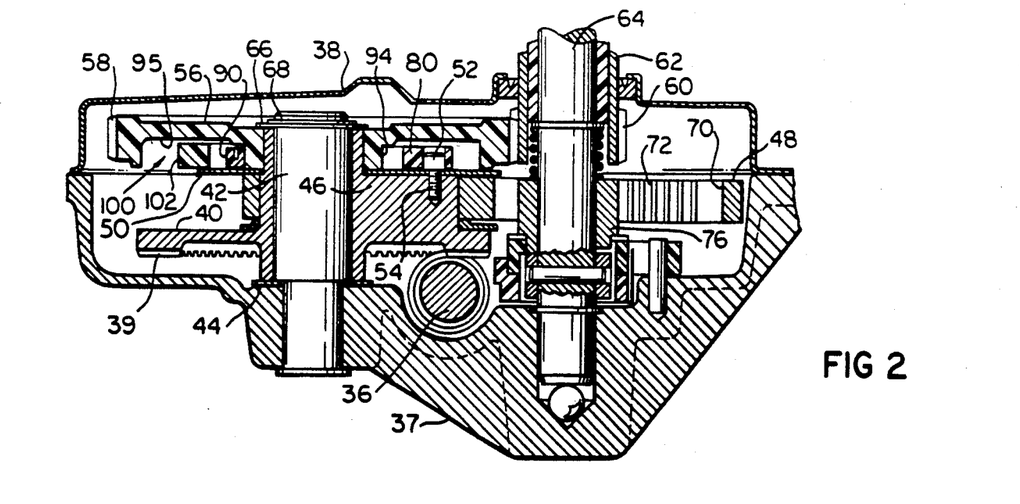
FIG. 2 is an enlarged sectional view of the clutch and spin delay mechanism taken generally along the lines II—II of FIG. 5.
Figure 5:
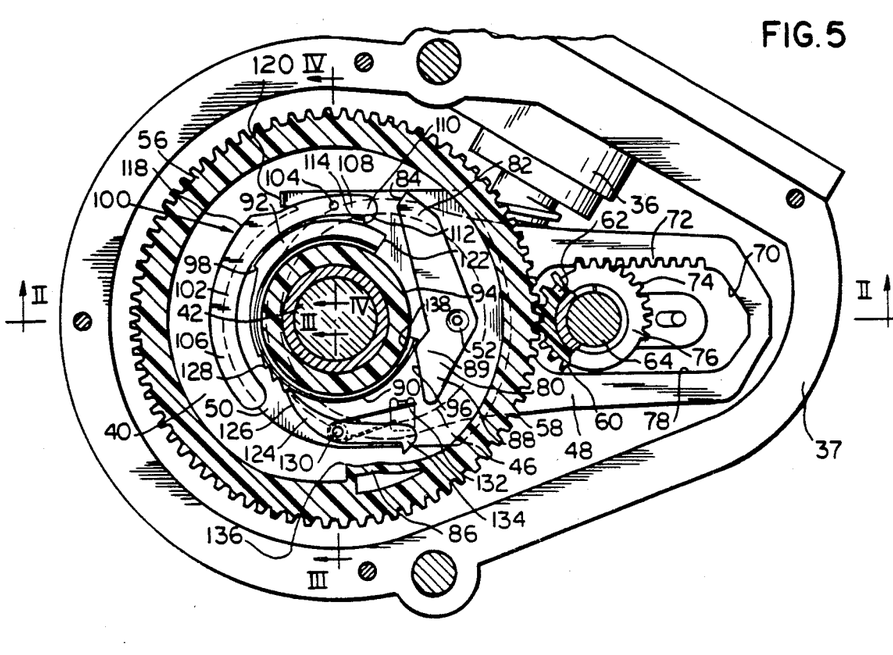
FIG. 5 is an enlarged sectional view of the clutch and spin delay mechanism of the laundry appliance of FIG. 1 in the spin interrupted position.

Referring to FIGS. 2 and 5, the transmission 26 receives a worm gear 36 which is carried on one end of a drive shaft (not shown), the other end of which is connected to the motor 24 (FIG. 1). The worm gear 36 is disposed within a transmission housing 37 including a gear case cover 38 and engages teeth 39 disposed circumferentially on a lower surface of a main drive gear 40. The drive gear 40 is rotatably mounted on a jack shaft 42 and rests on a bearing washer 44. An upper portion of the drive gear 40 has an eccentric 46 integrally formed thereon. One end of a rack 48 has an opening for receiving the eccentric and operates in slidable movement therewith. A bearing plate 50 is positioned above the rack 48 on the eccentric 46 and is held in place by a stud 52 which is received in a receptacle 54 in the eccentric 46. Mounted above the bearing plate 50 and concentric with the drive gear 40 is a spin gear 56 having teeth 58 which engage teeth 60 on a spin pinion 62 rotatable about agitator shaft 64. All elements mounted on the jack shaft 42 are maintained in adjacent relation by a washer 66 and a snap ring 68.

An opposite end of the rack 48 has a loop 70 which surrounds the agitator shaft 64. A row of teeth 72 are formed on one side of the loop 70 and engage teeth 74 formed on a portion of the exterior of an agitator pinion 76 rotatably mounted about the agitator shaft 64. The side of the loop 70 opposite the teeth 72 has a smooth bearing surface 78 movable against a portion of the exterior of the pinion 76 having no teeth thereon, thereby ensuring complete engagement of the teeth 74 on the agitate pinion and the teeth 72 on the rack. As the eccentric 46 is rotated by the main gear 40, a reciprocal motion in a plane normal to the agitator shaft 64 is imparted to the rack 48. This reciprocatory motion is transferred to the agitate pinion 76 by means of engagement of the teeth 72 and 74, causing an oscillatory motion in the agitate pinion. This oscillatory motion is then transferred to the agitator shaft 64 through a jaw clutch means as described and disclosed in U.S. Pat. No. 4,218,899 which is incorporated herein by reference.

Figure 6:
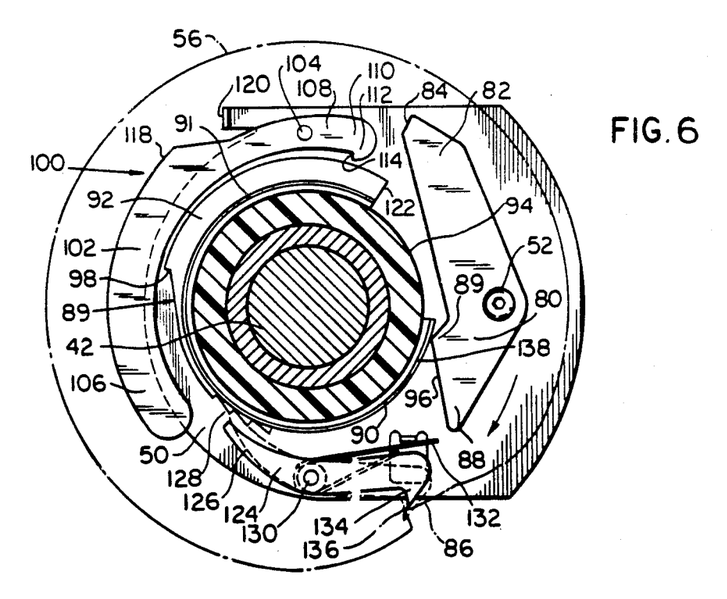
FIG. 6 is a sectional view similar to that shown in FIG. 5 with the mechanism moving from the spin to agitate position and the interior surface of a spin gear shown in broken lines.
Figure 8:
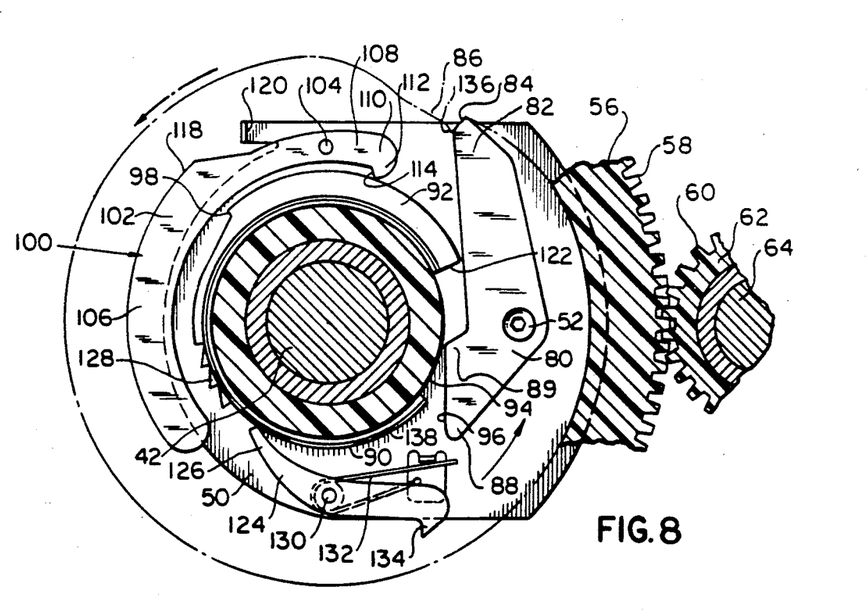
FIG. 8 is a sectional view similar to that shown in FIG. 5 with the mechanism in the spin position.

As seen in FIGS. 2, 5 and 6, there is a drive pawl 80 pivotally mounted on the stud 52 for corotation with the drive gear 40 about the jack shaft 42. The pawl 80 has a first end 82 having an angled surface or engagement means 84 which is capable of drivingly engaging an abutment 86 in an annular channel 95 formed in a lower side of the spin gear 56 when the drive pawl 80 is pivoted into a spin position such as shown in FIG. 8. A second end 88 of the drive pawl 80 is provided with an inwardly extending portion 89 to engage a portion of a control spring 90 to prevent pivotal movement of the drive pawl when the drive gear 40 is rotated at high speeds. The second end 88 is shaped to provide a clearance with the abutment 86 when the drive pawl 80 and drive gear 40 rotate in the clockwise agitate direction relative to the stationary spin gear 56.

The control spring 90 may be formed of a metal spring element 91 and a molded plastic portion generally designated 89 (FIG. 6). The control spring 90 has a radially outwardly extending and circumferentially elongated tang 92 and is fitted around an inner wall 94 of annular channel 95 of the spin gear 56. The control spring 90 is slidingly mounted on the inner wall 94 such that a rotating force supplied to the control spring 90 via the tang 92 will not cause rotation of the spin gear 56.

As the drive gear 40 rotates in the clockwise agitate direction, an inner surface 96 on the inwardly extending portion 89 of the drive pawl 80 contacts a first edge 98 of the tang 92 which causes the drive pawl 80 to pivot about stud 52 in a counterclockwise direction. This pivoting action moves the second end 82 of the drive wall inwardly so that it will clear the abutment 86 on the spin gear 56. As the drive pawl 80 mounted on the drive gear 40 continues to rotate in a clockwise direction around the jack shaft 42, the control spring 90 and tang 92 are caused to slide on the surface 94 of the spin gear without causing the spin gear itself to rotate.

Figure 4:
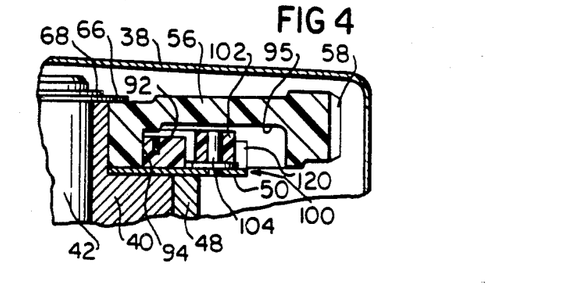
FIG. 4 is an enlarged partial sectional view of the second pawl latch mechanism taken generally along the lines IV—IV of FIG. 5.

Upon reversal of the drive motor 24, the transmission mechanism would normally shift into a spin position in accordance with the teachings of U.S. Pat. No. 4,218,899. However, there is provided a latch means designated generally at 100 in FIGS. 2 and 4 through 8 which is comprised of a latch pawl 102 pivotally mounted by means of a pivot pin 104 (FIG. 4) to the bearing plate 50 which is secured for rotation with the eccentric 46 of the drive gear 40. The latch pawl 102 is pivotally mounted in an off-center manner such that a first end 106 extends a greater distance from the pivot pin 104 and contains more mass than a second end 108. The second end 108 has a hook portion 110 associated therewith which comprises a radially inwardly extending nose portion 112 and an abutment surface 114.

As the latch pawl 102 rotates with the rotating drive gear 40, centrifugal force acting on the relatively massive and extending first end 106 of the latch pawl 102 causes the latch pawl to pivot in a clockwise manner about pivot pin 104. A stop member 120 is provided radially outwardly from the latch pawl 102 comprising an upturned finger portion of bearing plate to provide a limit on the pivotal movement of the latch pawl 102. This ensures that an outer surface 118 of the latch pawl 102 will not contact the abutment 86 on the spin gear 56 as the drive gear 40 rotates relative to the spin gear.

When the drive gear is rotating in the clockwise agitate direction, the tang 92 of the control spring 90 is contacted at edge 98 by the inner surface 96 of the drive pawl 80 which urges the drive pawl 80 to rotate counterclockwise about stud 52 into the neutral position. When the motor is shifted to the opposite spin and pump-out direction, the drive gear 40 rotates in a counterclockwise direction thereby resulting in the drive pawl 80 moving away from the tang 92 of the control spring 90. This occurs because the control spring 90 is mounted on the spin gear 56 which remains stationary.

Figure 7:
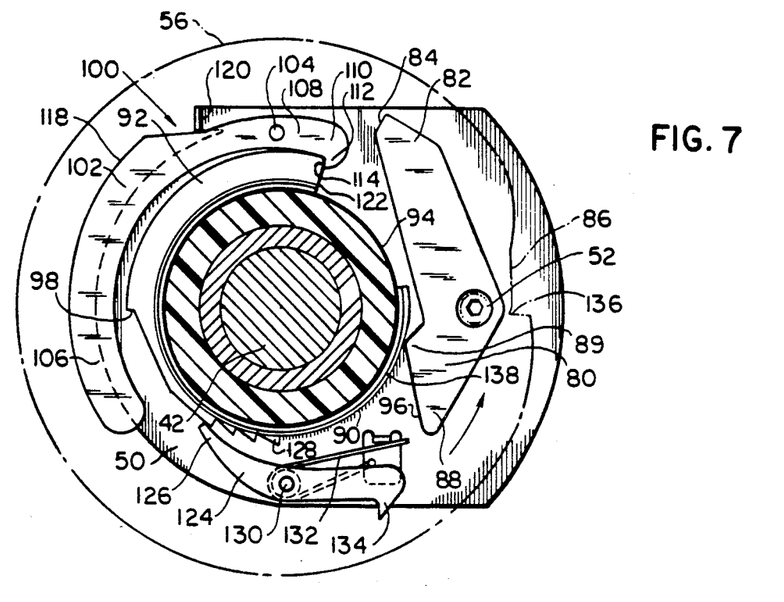
FIG. 7 is a sectional view similar to that shown in FIG. 5 with the mechanism in the neutral position.

As the drive gear 40 begins moving in the counterclockwise spin and pump-out direction, centrifugal force acts on the first end 106 of the latch pawl 102 urging it outward and thereby causing the hook portion 110 to be pivoted inwardly. As the drive gear 40 continues its rotation, the abutment surface 114 of the hook 110 comes into contact with a second edge 122 of the tang 92 as seen in FIG. 7. The hook 110 positively captures the tang 92 and thereby prevents it from contacting the second end 82 of the drive pawl 80 which would cause it to move into the spin position. In this manner, the drive pawl 80 remains in the neutral position as is shown in FIG. 7 and the control spring 90 and tang 92 are caused to slide on the surface 94 of the spin gear 56 without rotating the spin gear. Thus, the pump is able to pump wash liquid from the wash tub without the basket 18 spinning.

The timer mechanism 34 is provided with a pause at the end of the pump-out portion of the wash cycle to allow the motor 24 and main drive gear 40 to come to rest. Since the frictional torque on the spin gear spring 90 is basically constant with velocity, a trip point occurs during deceleration of the main drive gear 40 which forces the latch pawl 102 to pivot in a counterclockwise direction about pin 104 thereby disengaging the hook portion 110 from the end 122 of the tang 92. Abutment surface 114 acts as a camming surface when acted on by the tang 92 to cause the second end 108 of the latch pawl 102 to pivot outwardly. This results in the drive pawl 80 rotating into contact with end 122 of the tang 92 causing the first end 82 of the drive pawl 80 to be pivoted outwardly is shown in FIG. 8.

Upon restarting the motor in the spin direction, the first end 82 of the drive pawl 80 will be rotated into contact with the abutment 86 such that the abutment surface 84 of the drive pawl 80 drivingly engages the abutment 86 and drives the spin gear 56 and thus the basket 18 in a rotary manner. In this mode, the drive gear 40 and spin gear 56 are corotating about the jack shaft 42 by means of the connection of the drive pawl 80.

Figure 3:
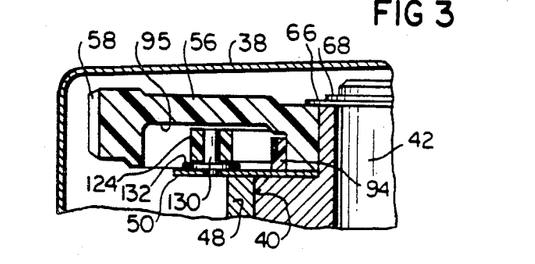
FIG. 3 is an enlarged partial sectional view of the stepping pawl latch mechanism taken generally along the lines III—III of FIG. 5.

If there is a power interruption to the motor 24 during the spin portion of the wash cycle, such as by opening lid 16, it has been found that the basket 18 will continue to coast after the drive gear 40 has stopped. This results in the control spring 90 and tang 92 rotating in a counterclockwise direction away from the drive pawl 80. As the basket, and thus spin gear 56 make one revolution, the abutment 86 would push against the first end 82 of the drive pawl 80 causing it to pivot in a counterclockwise direction and thus into the neutral position. To prevent the transmission from operating in the neutral position after power to the motor has been reinstated during the spin portion of the cycle, a stepping pawl 124 is provided which has a first end 126 operable to engage teeth 128 on the control spring 90 as seen in FIG. 5. The stepping pawl 124 is pivotally mounted on a pin 130 (FIG. 3) and the first end 126 is continuously urged inwardly by a spring means 132. A second end 134 of the stepping pawl 124 projects outwardly to be engaged by a protrusion 136 on the spin gear abutment 86 as seen in FIG. 6. Thus, the tang 92 is prevented from rotating counterclockwise past the hook portion 110 of the latch pawl 102.

If power to the motor is restarted in the spin direction, the mechanism will be in the position shown in FIG. 5 and as the drive gear rotates in the counterclockwise direction, the drive pawl 80 will be rotated into contact with the second end 122 of the tang 92 and will be pivoted again into the spin position as shown in FIG. 8. In this manner, the transmission will be prevented from remaining in the neutral position after any power interruption during the spin portion of the cycle.

If the motor is restarted in the agitate direction after power interruption during the spin portion of the cycle, with the mechanism in the position shown in FIG. 5, the drive gear 40 will begin rotating in the clockwise direction and the spin gear 56 will remain stationary. The stepping pawl 124 will have its first end 126 engaging a tooth on the control spring 90, thus causing the spring 90 to rotate with the drive gear 40. As the second end 134 of the stepping pawl 124 passes the stationary protrusion 136 on the spin gear abutment 86, the stepping pawl 124 will be rotated counterclockwise against the bias of spring means 132 to step one tooth on the control spring 90 (FIG. 6). Thus, in the arrangement shown where there are four ratchet teeth, four rotations of the main drive gear 40 will step the pawl 124 past the teeth and allow the second end 98 of the tang 92 to be driven by the driving pawl 80.

Portion 138 on the control spring 90 positively prevents the drive pawl 80 from rotating too far in a clockwise direction during the agitate or pump-out portion of the wash cycle which would otherwise allow it to engage protrusion 136 on the spin gear.

An alternate embodiment of the present invention is shown in FIGS. 9 through 12 which utilizes a slightly modified control spring 90A and a modified drive pawl 80A. Also, this embodiment does not utilize the stepping pawl 124 of the first embodiment. In all other respects, the parts in this embodiment may be identical with the parts in the previous embodiment.

In this embodiment, the modified drive pawl 80A has a similarly shaped first end 82A with abutment surface 84A as described above. However, a second end 86A is enlarged to balance the first end 82A such that centrifugal force acting on the drive pawl 80A will not cause either end to pivot about stud 52.

Figure 12:
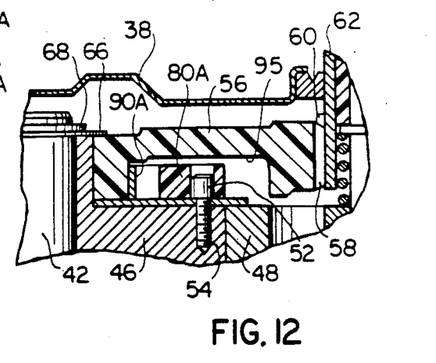
FIG. 12 is a partial sectional view of the drive pawl mechanism of FIG. 9 taken generally along the lines XII—XII of FIG. 10.

An inwardly extending portion 89A on the drive pawl 80A is positioned on the first end 82A side of the pivot stud 52. An inner surface 96A of the drive pawl 80A is shaped in a concave curve. The mounting arrangement for the drive pawl 80A is shown in FIG. 12.

The modified control spring 90A comprises a generally circular spring with an out-turned tang 92A having a minimum width equal to the thickness of the spring 90A. As described above, the control spring 90A is mounted on surface 94 of the spin gear 56 in a sliding manner.

Figure 9:
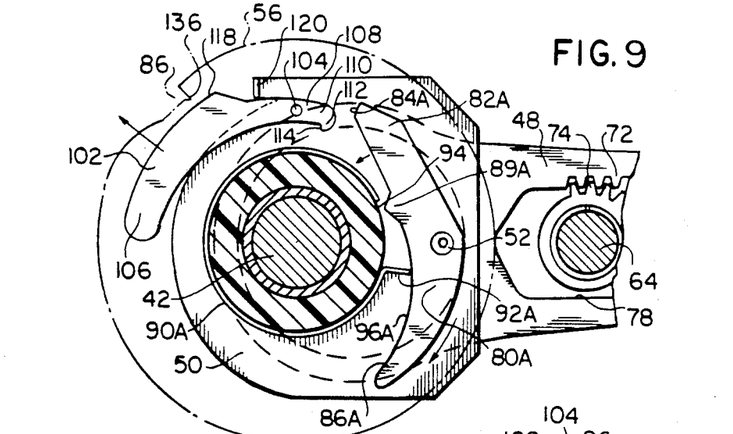
FIG. 9 is a partial sectional view of an alternate embodiment of the neutral pump-out mechanism in the agitate position.

In operation, as the drive gear 40 rotates in the clockwise agitate direction as shown in FIG. 9, the drive pawl 80A rotates into contact with the tang 92A which rides on surface 96A to cause the drive pawl 90A to rotate about stud 52 in a counterclockwise direction thereby urging the second end 82A inwardly. The control spring 90A is then caused to slide on the spin gear 56. The latch pawl 102 is limited in its pivotal movement about pin 104 by the upturned finger stop member 120. Thus, the spin gear 56 remains stationary while the main drive gear 40 rotates in the agitate direction.

Figure 10:
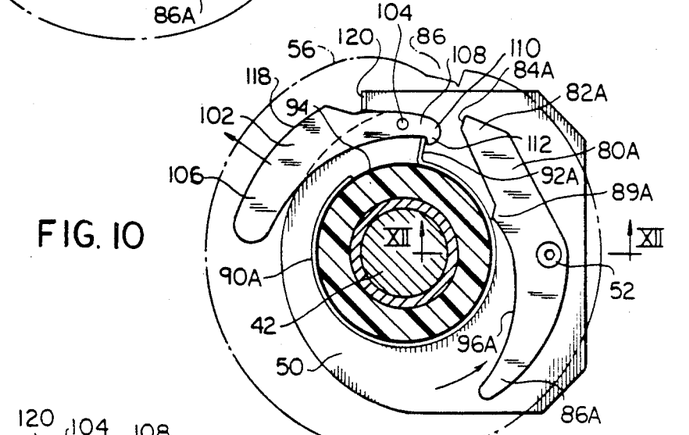
FIG. 10 is a partial sectional view of the embodiment of FIG. 9 in the neutral position.

When the motor is reversed and the drive gear 40 begins to rotate in the counterclockwise spin and pump-out direction, the drive pawl 80A rotates away from the tang 92A and the latch pawl 102 rotates toward the tang 92A. Centrifugal force causes the first end 106 of latch pawl 102 to pivot outwardly and thus the hook 110 to pivot inwardly. The tang 92A is captured by the hook 110 as seen in FIG. 10, thus preventing the tang 92A from contacting the second end 82A of the drive pawl 80A.

Figure 11:
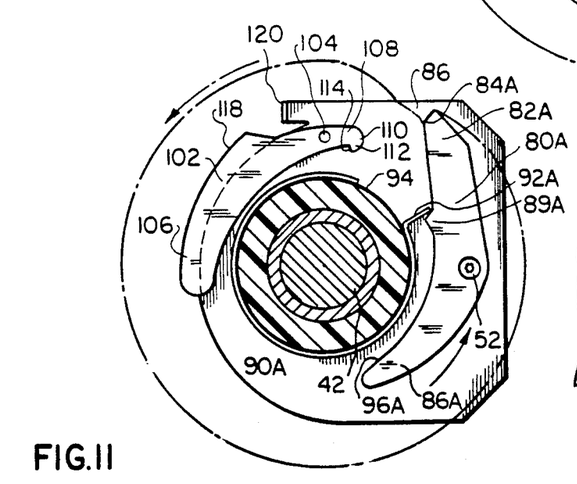
FIG. 11 is a partial sectional view of the embodiment of FIG. 9 in the spin position.

As described above, there is a pause at the end of the pump-out portion of the wash cycle to allow the motor and main drive gear 40 to come to rest. At the trip point, the latch pawl 102 pivots in a counterclockwise direction about pin 104 aided by the camming action described above thereby disengaging the hook portion 110 from the tang 92A. This results in the drive pawl 80A rotating into contact with the tang 92A causing the first end 82A of the drive pawl 80A to be pivoted outwardly as shown in FIG. 11. In this position, the abutment surface 84A of the first end 82A will contact the abutment 86 of the spin gear such that the drive gear 40 will drive the spin gear 56 through the drive pawl 80A connection.

When the motor returns again to the agitate direction, the drive gear 40 will again rotate in the clockwise direction resulting in the first end 82A of the drive pawl 80A rotating away from the tang 92A and the second end 86A rotating toward the tang 92A until the mechanism is again in the agitate position shown in FIG. 9 where the first end 82A is pivoted inwardly to avoid contact with the abutment 86 on the spin gear 56.

A second alternate embodiment is shown in FIGS. 13 through 18 which utilizes the modified drive pawl 80A of the first alternate embodiment and which utilizes a further modified control spring 90B. A locking ring element 140 is used in this embodiment and a modified bearing plate 50B is also utilized. In all other respects, the structure is identical to that utilized in the first alternate embodiment of FIGS. 9 through 12.

The modified control spring 90B has an elongated tang 92B with a first end 98B and an end 122B. The control spring 90B may be constructed by having a metal spring element 91B and a molded plastic tang 92B.

The modified bearing plate 50B has a cut-out portion 142 opposite the drive pawl 80A defining a first end wall stop 144 and a second end wall stop 146.

Figure 16:
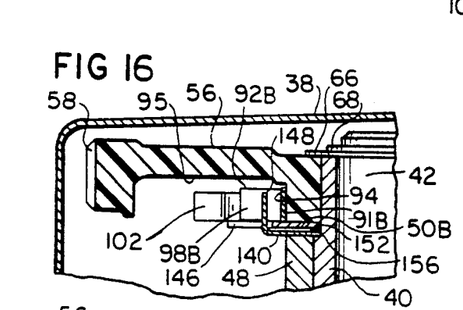
FIG. 16 is a partial sectional view of a lock out ring tab taken generally along the lines XVI—XVI of FIG. 15.
Figure 17:
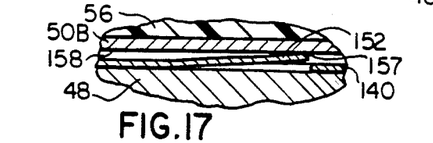
FIG. 17 is an enlarged sectional view of the friction fingers on a backing ring.
Figure 18:
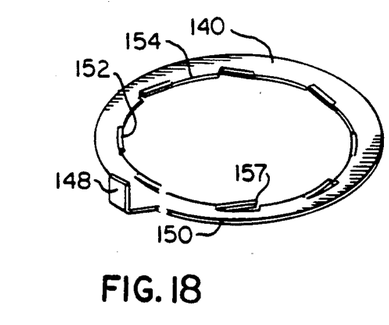
FIG. 18 is a perspective view of the lock out ring.

As seen in FIGS. 16, 17 and 18, the locking ring 140 is generally circular with an outwardly and upwardly extending tab 148 attached to an outer circumference 150 and a series of angled friction fingers 152 positioned around an inner circumference 154. The locking ring 140 is mounted beneath the bearing plate 50B on a shoulder 156 of the drive gear 40 and on the rack 48 as seen in FIG. 16. The tab 148 is positioned within the cut-out 142 between the two end walls 144 and 146. The angled friction fingers 152 have upper ends 157 which contact a lower surface 158 of the bearing plate 50B such that the locking ring 140 will easily rotate in a clockwise direction relative to the bearing plate 50 but will not easily rotate in a counterclockwise direction.

Figure 13:
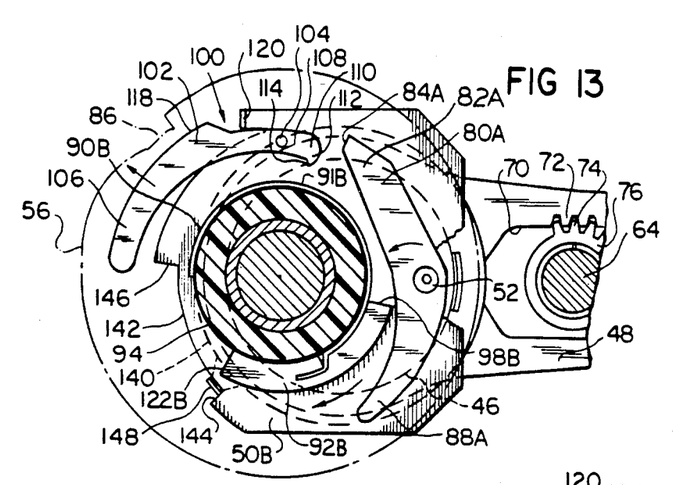
FIG. 13 is a partial sectional view of a second alternate embodiment in the agitate position.

In operation, when the drive gear 40 is rotating in the clockwise agitate direction, the drive pawl 80A will be rotated toward the first end 98B of the tang 92B such that the second end 88A of the drive pawl 80A will be urged outwardly and the first end 82A will be urged inwardly to prevent contact with the abutment 86 on the spin gear 56, as shown in FIG. 13. The bearing plate 50B is also rotating with the drive gear 40 in a clockwise direction and the locking ring 140 slips relative to the bearing plate 50B until the tab 148 abuts against the end wall stop 144.

Figure 14:
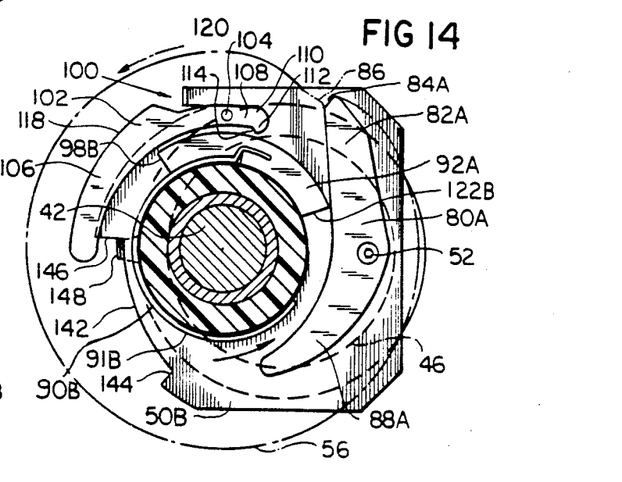
FIG. 14 is a partial sectional view of the embodiment of FIG. 13 in the spin position.
Figure 15:
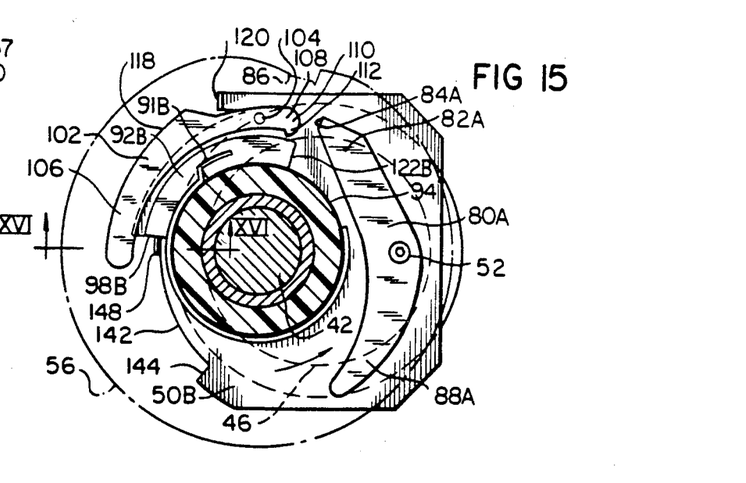
FIG. 15 is a partial sectional view of the embodiment of FIG. 13 in the spin interrupted position.

As the motor and drive gear 40 reverse to the counterclockwise spin and pump-out direction, the mechanism operates as before where the second end 122B of the tang 92B is captured by the hook 110 of the latch pawl 102 until the pause at the end of the pump-out portion of the wash cycle at which time the latch pawl 102 releases the tang 92B such that the second end 122B of the tang urges the first end 82A of the drive pawl 80A outwardly so that it will drivingly engage the abutment 86 of the spin gear 56 as seen in FIG. 14. With the drive gear and bearing plate 50B rotating in the counterclockwise direction, the locking ring 140 will rotate relative to the bearing plate until the tab 148 abuts the end wall stop 146 (FIG. 14). Because the locking ring 140 is mounted on the eccentric 46, the tab 148 when stopped by end wall 146 is relatively close to the surface 94 of the spin gear 56 which carries the control spring 90B as opposed to when the tab 148 is stopped by end wall 144 as seen in FIG. 13 where it is spaced further from surface 94.

If there is a power interruption during the spin portion of the cycle, the basket and spin gear 56 will coast in a counterclockwise rotational direction relative to the stopped drive gear 40 thereby causing the tang 92B to rotate away from the first end 82A of the drive pawl 80A. However, tab 148 of the locking ring 140 prevents the tang from rotating past the hook 110 of the latch pawl 102. With the drive gear 40, rack 48 and bearing plate 50B stationary, the locking ring 140 will tend to also remain stationary. The friction provided by fingers 152 of the locking ring against the lower surface 158 of the bearing plate 50B is greater than the frictional force of the control spring 90B on surface 94 of the spin gear 56 such that the tab 148 will remain stationary and will prevent the tang 92B and control spring 90B from rotating with the spin gear 56. Thus, the second end 122B of the tang 90B will be prevented from rotating past the hook 110 of the latch pawl 102.

If the spin operation is resumed, the drive gear 40 will cause the drive pawl 80A to rotate toward the tang 92B again urging the first end 82A outwardly so that it will drivingly contact the abutment 86 of the spin gear 56 so that the drive gear 40 will again drive the spin gear 56 and basket 18 in a spinning direction. If the machine is operated in the agitate direction after power interruption, the drive gear will rotate in the clockwise direction causing tab 148 to move toward stop wall 144 and at the same time outwardly away from control spring 90B thereby releasing the tang 92B to allow the first end 98B of the tang to contact the second end 86A of the drive pawl 80A and thus pivoting the first end 82A inwardly.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly comes within the scope of my contribution to the art.

The embodiments of the invention in which an exclusive property or privilege is claimed are defined as follows:

1. In an automatic laundry appliance, including
    a tub for receiving wash liquid,
    a receptacle within said tub for receiving a clothes load,
    a motor selectively coupled to a first drive means in a first direction of rotation for agitating a clothes load and in a second direction of rotation to a second drive means for spinning said receptacle containing said clothes load,
    a pump means driven by said motor for removing said wash liquid from said tub,
    a presettable sequential control means for controlling a cycle of operation including a period when said first drive means is decoupled followed by a period when said second means is coupled to said motor,
    a delay means for delaying coupling of said second drive means until said pump means has removed a quantity of said wash liquid from said tub, said delay means comprising:
    an automatically actuatable rotating engagement means for drivingly engaging said second drive means; and
    an automatically actuable latch means preventing engagement of said engagement means with said second drive means after said engagement means has been automatically actuated by rotation of said motor in said second direction until said control means interrupts said motor operation in said second direction.

2. The device of claim 1 wherein said rotating engagement means comprises a drive pawl means pivotable between a first and second position and rotated by said motor and drivingly engagable with said second drive means in said second pivoted position.

3. In an automatic laundry appliance, including
    a tub for receiving wash liquid,
    a receptacle within said tube for receiving a clothes load,
    a motor selectively coupled to a first drive means in a first direction of rotation for agitating a clothes load and in a second direction of rotation to a second drive means for spining said receptacle containing said clothes load,
    a pump means driven by said motor for removing said wash liquid from said tub,
    a presettable sequential control means for controlling a cycle of operation including a period when said first drive means is decoupled followed by a period when said second means is coupled to said motor,
    a delay means for delaying coupling of said second drive means until said pump means has removed a quantity of said wash liquid from said tube, said delay means comprising:
    an automatically actuatable rotating engagement means for drivingly engaging said second drive means;
    said rotating engagement means comprising a drive pawl means pivotable between a first and second position, rotatable by said motor and drivingly engagable with said second pivotated position;
    latch means preventing engagement of said engagement means with said second drive means after said engagement means has been automatically actuated by rotation of said motor in said second direction until said control means interrupts said motor operation in said second direction.

4. The device of claim 3 wherein said spring means comprises a control spring means slidingly mounted on said second drive means to selectively engage a surface of said drive pawl means to pivot said drive pawl between said first and second positions depending on the direction of rotation of said first drive means relative to said second drive means.

5. An automatic laundry appliance comprising the combination:
    a receptacle within said tub for receiving a clothes load,
    a motor selectively coupled through a transmission and a rotatable drive gear to a first drive means in a first direction of rotation for agitating a clothes load and in a second direction of rotation to a second drive means for spinning said receptacle containing said clothes load,
    a pump means driven by said motor for removing said wash liquid from said tub,
    a presettable sequential control means for controlling a cycle of operation including a period when said first drive means is decoupled followed by a period when said second means is coupled to said motor,
    drive pawl means pivotally mounted on said drive gear for rotation therewith;
    said pawl means pivotable between a first and second position;
    rotatable means for pivoting said pawl means to said first position when said drive gear is rotating in said first direction and to said second position when said drive gear is rotating in said second direction;
    means associated with said drive pawl means and said second drive means when said pawl means is in said second position to cause said pawl means to drive said second drive means in said second rotational direction; and
    means to selectively intercept said rotatable means in said second rotational direction to prevent said rotatable means from pivoting said pawl means to said second position.

* * * * *